(12) United States Patent
Mishra et al.

(10) Patent No.: US 8,823,820 B2
(45) Date of Patent: Sep. 2, 2014

(54) METHODS AND APPARATUSES FOR CAPTURING AN IMAGE

(75) Inventors: Pranav Mishra, Bangalore (IN); Krishna Annasagar Govindarao, Bangalore (IN); Gururaj Gopal Putraya, Bangalore (IN)

(73) Assignee: Nokia Corporation, Espoo (FI)

( * ) Notice: Subject to any disclaimer, the term of this patent is extended or adjusted under 35 U.S.C. 154(b) by 119 days.

(21) Appl. No.: 13/451,934

(22) Filed: Apr. 20, 2012

(65) Prior Publication Data

US 2013/0107073 A1    May 2, 2013

(30) Foreign Application Priority Data

May 2, 2011    (IN) .............................. 1521/CHE/2011

(51) Int. Cl.
 *H04N 5/225*    (2006.01)
 *H04N 5/232*    (2006.01)
 *H04N 101/00*    (2006.01)
(52) U.S. Cl.
 CPC ........ *H04N 5/23232* (2013.01); *H04N 2101/00* (2013.01); *H04N 5/23238* (2013.01)
 USPC .................................... 348/218.1; 348/219.1
(58) Field of Classification Search
 None
 See application file for complete search history.

(56) References Cited

U.S. PATENT DOCUMENTS

| 7,180,541 | B2* | 2/2007 | Kinjo | ........................... 348/239 |
| 2007/0084927 | A1 | 4/2007 | Itou et al. | |
| 2007/0188624 | A1 | 8/2007 | Zhang | |
| 2010/0013906 | A1 | 1/2010 | Border et al. | |
| 2013/0038680 | A1* | 2/2013 | Mashiah | .......................... 348/36 |

FOREIGN PATENT DOCUMENTS

JP    2000134549 A    5/2000

OTHER PUBLICATIONS

International Search Report and Written Opinion received for corresponding Patent Cooperation Treaty Application No. PCT/FI201/050348, dated Sep. 13, 2012, 13 pages.
Robinson, "Crime Scene Photography", Chapter 10, Second Edition, Academic Press, Feb. 2010, pp. 496.
Carlson, "Using the Stitch Assist Mode", Chapter 7, Landscape Photography, Canon PowerShot G10 / G11: From Snapshots to Great Shots, 2010, 1 page.

* cited by examiner

*Primary Examiner* — Twyler Haskins
*Assistant Examiner* — Angel L Garces-Rivera
(74) *Attorney, Agent, or Firm* — Harrington & Smith

(57) ABSTRACT

Methods and apparatuses are provided for capturing an image. A method may include determining a scene to be captured at a first resolution. The scene to be captured may be within a field of view of an image sensor. The method may further include causing capture by the image sensor of a plurality of sub-images at a second resolution. The second resolution may be less than the first resolution. Each of the plurality of sub-images may depict a portion of the scene to be captured. The method may additionally include using the plurality of sub-images to generate an output image depicting the scene to be captured at the first resolution. Corresponding apparatuses are also provided.

20 Claims, 9 Drawing Sheets

METHODS AND APPARATUSES FOR CAPTURING AN IMAGE

TECHNOLOGICAL FIELD

Example embodiments of the present invention relate generally to imaging technology and, more particularly, relate to methods and apparatuses for capturing an image.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing functionality that only a few years ago required processing power provided only by the most advanced desktop computers. Consequently, mobile computing devices having a small form factor have become ubiquitous and are used by consumers of all socioeconomic backgrounds.

As a result of the expansion in computing power and reduction in size of mobile computing devices, mobile computing devices are being marketed with an ever increasing array of features. Among features now found on many mobile computing devices is image capture functionality. In this regard, increased processing power has enabled the capture of higher quality digital images. Further, improvements in memory capacity of mobile computing devices have enabled the capture and storage of greater numbers of images by mobile computing devices. Consequently, use of mobile computing devices to capture digital images is becoming increasingly prevalent and is replacing traditional film-based image capture. Nevertheless, many digital imaging devices continue to encounter limitations that inhibit the capture of high resolution images, which may be desired by photographers to enable the production of large prints of a captured scene.

BRIEF SUMMARY

Methods, apparatuses, and computer program products are herein provided for capturing an image. Methods, apparatuses, and computer program products in accordance with various embodiments may provide several advantages to computing devices and computing device users. Some example embodiments enable the obtainment of an image having a higher resolution than an output resolution generally supported by a camera device. Such example embodiments may be particular useful for a camera device having an image sensor that is capable of capturing an image having a greater resolution than an output resolution of the device, which may be constrained by hardware limitations, such as memory capacity, latency, and/or the like. Accordingly, some example embodiments may enable the capture of an image having a field of view and resolution up to that supported by an image sensor used for image capture even if hardware limitations prevent output of an image having such resolution by the image sensor. In particular, some example embodiments provide for capture of a plurality of sub-images having a resolution less than a desired captured resolution and depicting a portion of a scene to be captured. The sub-images may be used to generate an output image depicting the scene to be captured at the desired captured resolution. In some example embodiments, the capture of the plurality of sub-images may advantageously be performed in a manner transparent to the user in response to a single capture command provided by the user, which may define the desired scene to be captured. Accordingly, by capturing a plurality of sub-images depicting a portion of a field of view of an image sensor and stitching the sub-images to form an output image, some example embodiments may circumvent hardware limitations that limit an output resolution of an image sensor to less than a resolution which the image sensor is capable of capturing.

In a first example embodiment, a method is provided, which comprises determining a scene to be captured at a first resolution. The scene to be captured of this example embodiment is within a field of view of an image sensor. The method of this example embodiment further comprises causing capture by the image sensor of each of a plurality of sub-images at a respective second resolution. Each second resolution of this example embodiment is less than the first resolution. Each of the plurality of sub-images of this example embodiment depicts a portion of the scene to be captured. The method of this example embodiment additionally comprises using the plurality of sub-images to generate an output image depicting the scene to be captured at the first resolution.

In another example embodiment, an apparatus comprising at least one processor and at least one memory storing computer program code is provided. The at least one memory and stored computer program code are configured, with the at least one processor, to cause the apparatus of this example embodiment to at least determine a scene to be captured at a first resolution. The scene to be captured of this example embodiment is within a field of view of an image sensor. The at least one memory and stored computer program code are configured, with the at least one processor, to further cause the apparatus of this example embodiment to cause capture by the image sensor of each of a plurality of sub-images at a respective second resolution. Each second resolution of this example embodiment is less than the first resolution. Each of the plurality of sub-images of this example embodiment depicts a portion of the scene to be captured. The at least one memory and stored computer program code are configured, with the at least one processor, to additionally cause the apparatus of this example embodiment to use the plurality of sub-images to generate an output image depicting the scene to be captured at the first resolution.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method. The method of this example embodiment comprises determining a scene to be captured at a first resolution. The scene to be captured of this example embodiment is within a field of view of an image sensor. The method of this example embodiment further comprises causing capture by the image sensor of each of a plurality of sub-images at a respective second resolution. Each second resolution of this example embodiment is less than the first resolution. Each of the plurality of sub-images of this example embodiment depicts a portion of the scene to be captured. The method of this example embodiment additionally comprises using the plurality of sub-images to generate an output image depicting the scene to be captured at the first resolution.

In another example embodiment, an apparatus is provided that comprises means for determining a scene to be captured at a first resolution. The scene to be captured of this example embodiment is within a field of view of an image sensor. The apparatus of this example embodiment further comprises means for causing capture by the image sensor of each of a plurality of sub-images at a respective second resolution. Each second resolution of this example embodiment is less than the first resolution. Each of the plurality of sub-images of this example embodiment depicts a portion of the scene to be captured. The apparatus of this example embodiment additionally comprises means for using the plurality of sub-images to generate an output image depicting the scene to be captured at the first resolution.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
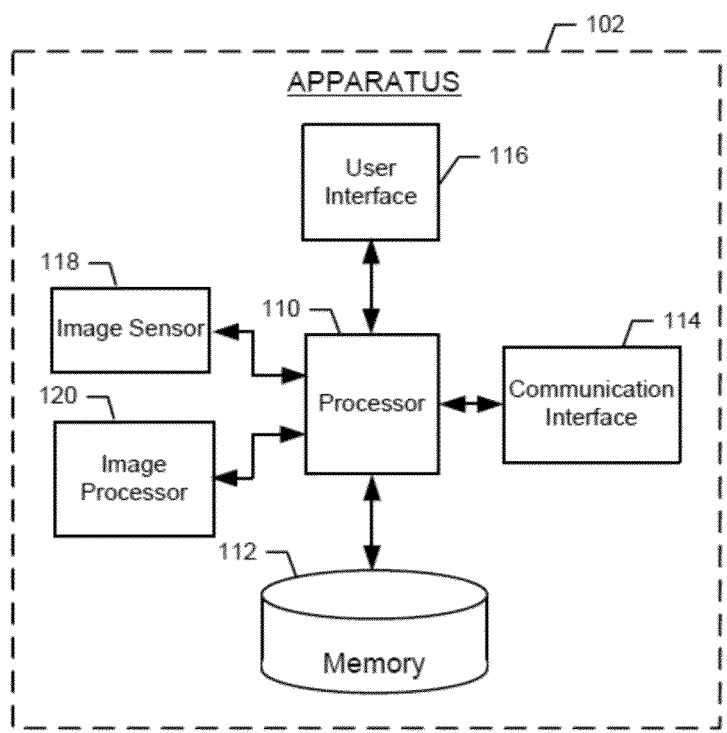
Figure 2:
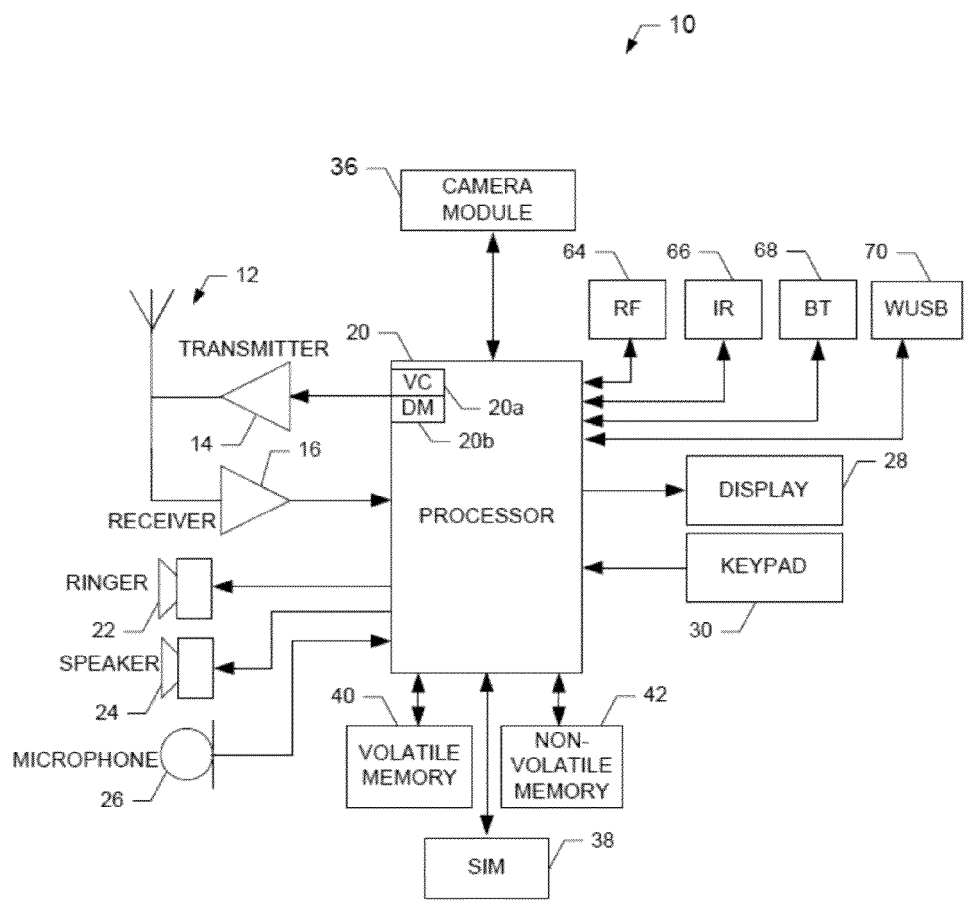
Figure 3:
Figure 4:
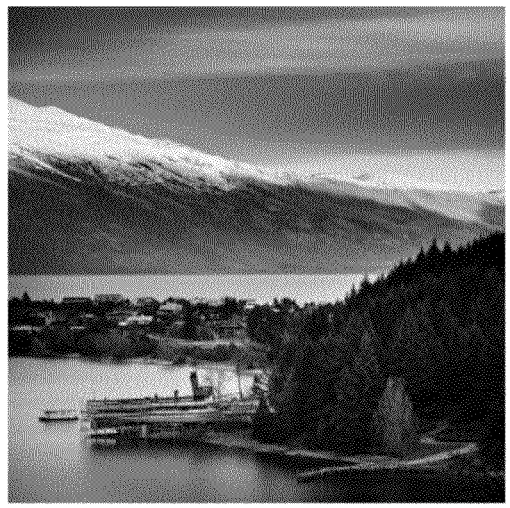
Figure 5:
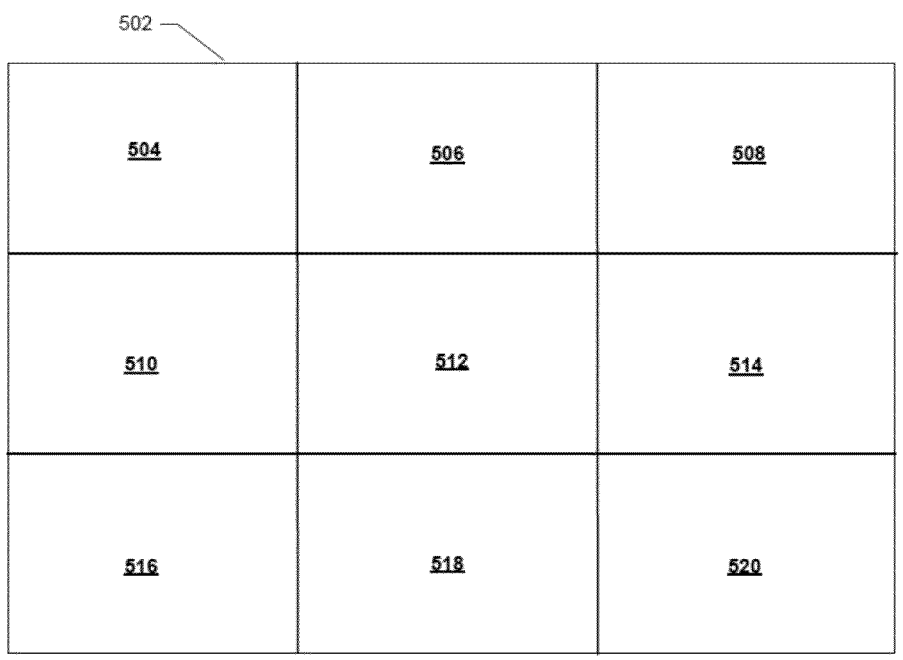
Figure 6:
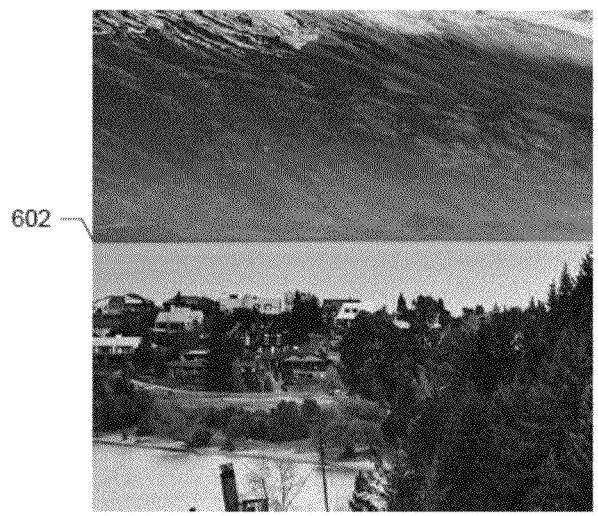
Figure 6:
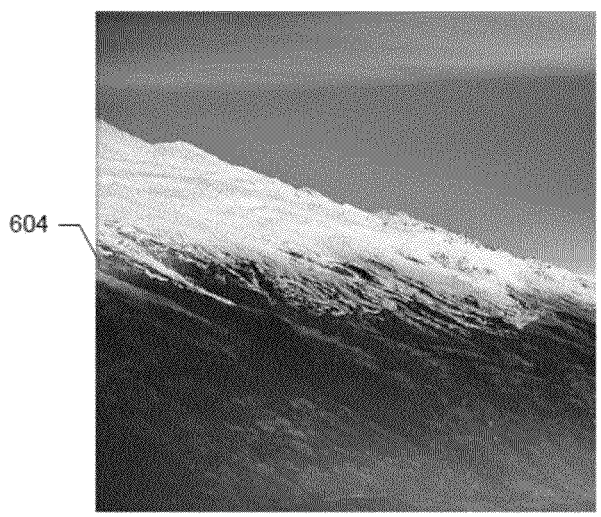
Figure 7:
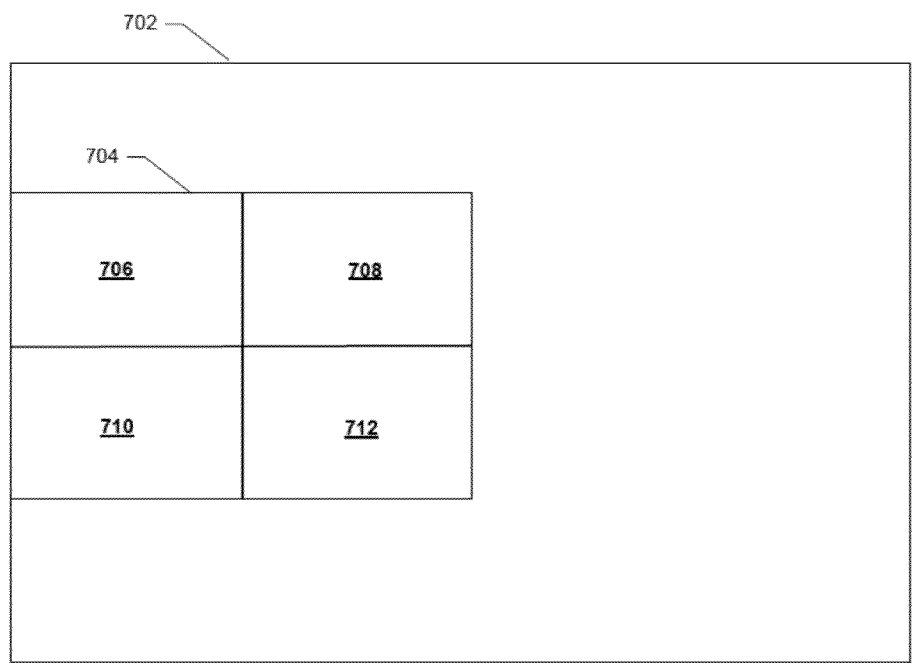
Figure 8:
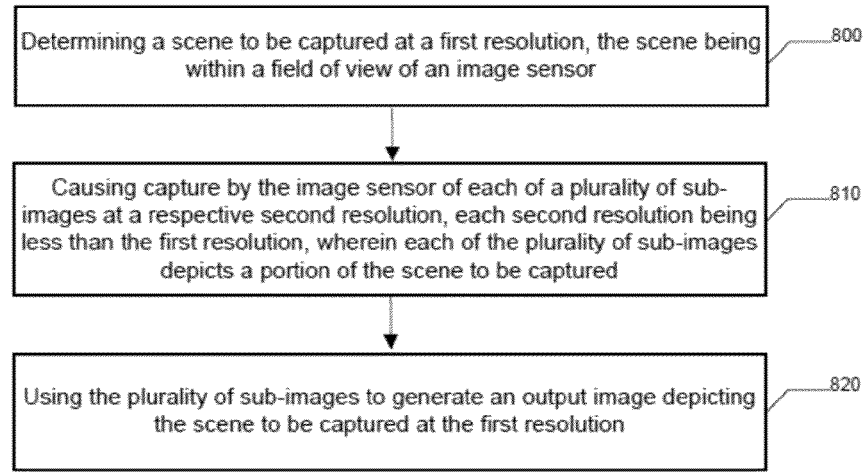
Figure 9:
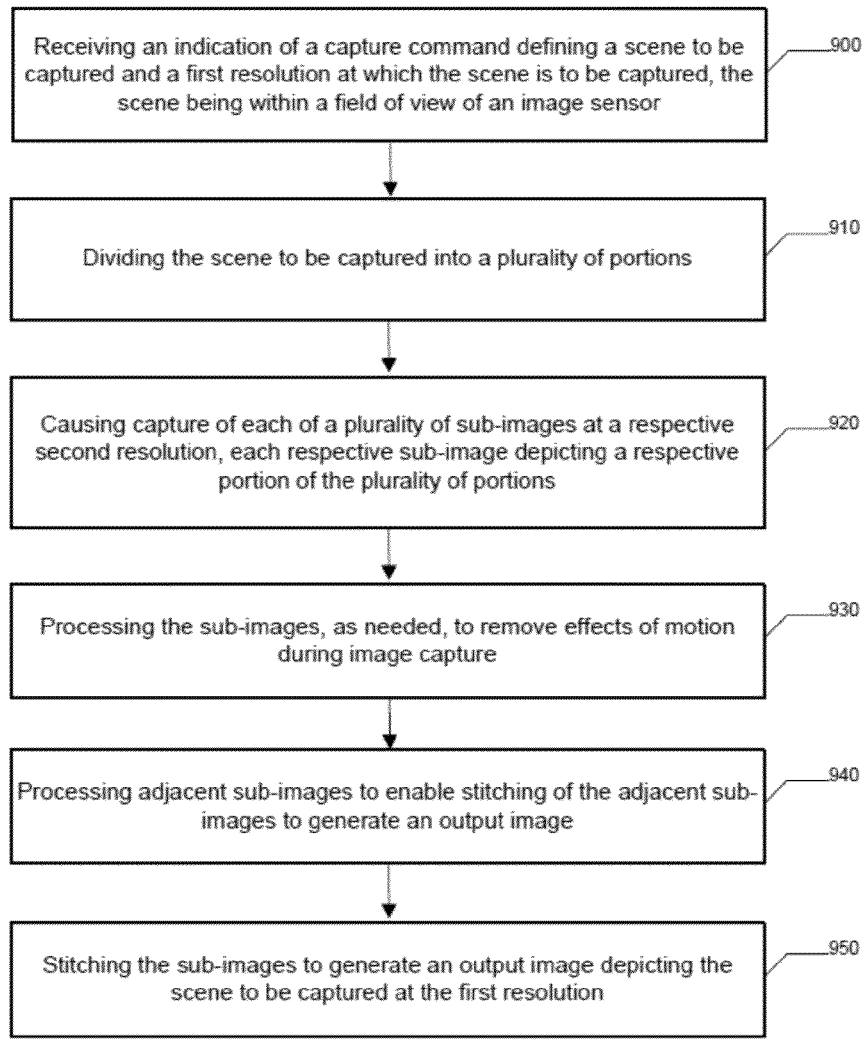

Having thus described embodiments of the invention in general terms, reference will now be made to the accompanying drawings, which are not necessarily drawn to scale, and wherein:

FIG. 1 illustrates a block diagram of an apparatus for capturing an image according to some example embodiments;

FIG. 2 is a schematic block diagram of a mobile terminal according to an example embodiment;

FIG. 3 illustrates an example scene to be captured;

FIG. 4 illustrates an example capture of the scene of FIG. 3 at the output resolution of an image sensor according to some example embodiments;

FIG. 5 illustrates division of a scene to be captured into a plurality of portions to be captured in sub-images according to some example embodiments;

FIG. 6 illustrates example sub-images that may be captured of portions of the scene of FIG. 3 according to some example embodiments;

FIG. 7 illustrates division of a region of interest of a field of view of an image sensor into a plurality of portions to be captured in sub-images according to some example embodiments;

FIG. 8 illustrates a flowchart according to an example method for generating an output image capturing a desired scene according to some example embodiments; and FIG. 9 illustrates a flowchart according to another example method for generating an output image capturing a desired scene according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Some computing devices including digital camera functionality may use an image sensor having a capture resolution greater than its output resolution. As an example, some computing devices may use an extremely high resolution image sensor, which may, for example, comprise an image sensor capable of capturing an image having a resolution greater than 12 mega pixels (MP). Such extremely high resolution image sensors may further offer wide field of view optics allowing for capture of an image having a widefield of view (FOV). However, the effective output resolution of such images sensors may be limited to a spatial resolution less than the capture resolution due to device hardware constraints, such as limited memory capacity, limited interface speed (e.g., limited bus speed), latency, and/or the like. For example, if an image captured at the extremely high resolution were processed by an image signal processor (ISP) of some example devices, the latency may be too great to effectively process the image while still providing a fast and satisfactory user experience. Accordingly, encoding and outputting such an image may be problematic given hardware limitations of some computing devices, even if an extremely high resolution image sensor is used.

As a result of such hardware limitations, a camera including a sensor having a greater capture resolution than output resolution will output images that may have a significantly lower resolution than the capture resolution of which the image sensor is capable. For example, in some current implementations, a user may select a desired field of view and an image captured of the desired field of view may be downsampled in the image sensor such that the resolution is no greater than the output resolution of the camera and the lower resolution image is output so as to avoid memory and latency problems. Accordingly, some current cameras are designed in way that an image output at a full FOV and resolution of which an image sensor is capable of capturing will never be available to the user. Such current cameras may accordingly offer two possible output scenarios:

A wide FOV image at the output resolution (e.g., at 5 MP)—This scenario may offer a desired FOV, but given the limited resolution, zooming into the image may not show much detail and, as such, it may not be possible to produce a large print of a captured scene.

A narrow FOV at the output resolution (e.g., at 5 MP): This is scenario may offer a high spatial resolution image given the field of view, which may allow production of a large print of the captured scene. However, the FOV of the image is limited and may be less than desired. Use of a narrow FOV at the output resolution may be seen as the equivalent of capturing an image using optical zoom focusing only on the desired region of the image (or limited FOV).

Some example embodiments of the invention may address such limitations by capturing a plurality of sub-images, each capturing a portion of a desired field of view, and using the sub-images to generate an output image having a desired field of view and a desired resolution, which may be greater than an output resolution of an image sensor used to capture the sub-images. Referring now to FIG. 1, FIG. 1 illustrates a block diagram of an apparatus 102 for capturing an image according to some example embodiments. It will be appreciated that the apparatus 102 is provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of an apparatus for capturing an image, other configurations may also be used to implement embodiments of the present invention.

The apparatus 102 may be embodied as a desktop computer, laptop computer, mobile terminal, mobile computer, mobile phone, mobile communication device, game device, digital camera/camcorder, audio/video player, television device, digital video recorder, positioning device, chipset, a computing device comprising a chipset, any combination thereof, and/or the like. In this regard, the apparatus 102 may comprise any computing device or other apparatus that is configured to generate an image in accordance with one or more example embodiments disclosed herein. In an example embodiment, the apparatus 102 is embodied as a mobile computing device, such as the mobile terminal illustrated in FIG. 2.

In this regard, FIG. 2 illustrates a block diagram of a mobile terminal 10 representative of one embodiment of an apparatus 102. It should be understood, however, that the mobile terminal 10 illustrated and hereinafter described is merely illustrative of one type of apparatus 102 that may implement and/or benefit from various embodiments of the invention and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), future communication, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal In some example embodiments, the mobile terminal 10 may include a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may include a digital camera capable of forming a digital image file from a captured image. In addition, the digital camera of the camera module 36 may be capable of capturing a video clip. As such, the camera module 36 may include all hardware (for example, a lens or other optical component(s), image sensor, image signal processor, and/or the like) and software necessary for creating a digital image file from a captured image as well as a digital video file from a captured video clip. Alternatively, the camera module 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera module 36 may be displayed on the display 28 of the mobile terminal 10 to illustrate a view of an image currently displayed which may be captured if desired by the user. As such, as referred to hereinafter, an image may be either a captured image or an image comprising the object or objects currently displayed by the mobile terminal 10, but not necessarily captured in an image file. In an example embodiment, the camera module 36 may further include a processing element such as a co-processor which assists the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. One or more of the volatile memory 40 or non-volatile memory 42 may be embodied as a tangible, non-transitory memory. The memories may store one or more software programs, instructions, pieces of information, data, and/or the like which may be used by the mobile terminal for performing functions of the mobile terminal For example, the memories may comprise an identifier, such as an international mobile equipment identification (IMEI) code, capable of uniquely identifying the mobile terminal 10.

Returning to FIG. 1, in some example embodiments, the apparatus 102 includes various means for performing the various functions herein described. These means may comprise one or more of a processor 110, memory 112, communication interface 114, user interface 116, image sensor 118, or image processor 120. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, user interface 116, image sensor 118, and/or image processor 120 may be at least partially embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to one or more example embodiments while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42. The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, captured sub-images, captured images, and/or the like. This stored information may be stored and/or used by the image sensor 118 and/or image processor 120 during the course of performing their functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. The communication interface 114 may additionally be in communication with the memory 112, user interface 116, image sensor 118, and/or image processor 120, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises or is in communication with a display, the display may comprise, for example, a cathode ray tube (CRT) display, a plasma display panel (PDP), a liquid crystal display (LCD), a light-emitting diode (LED), an organic light-emitting diode display (OLED), a projector (e.g., a projector configured to project a display on a projection screen, wall, and/or other object), a holographic display, or the like. Such display may be configured to serve as a viewfinder for a camera (e.g., a camera including or in operative communication with the image sensor 118), which may be embodied on or in operative communication with the apparatus 102 when such camera is in operation. Alternatively, the user interface 116 may comprise a display configured as a dedicated viewfinder for a camera. In embodiments wherein the user interface 116 comprises a touch screen display, the user interface 116 may additionally be configured to detect and/or receive an indication of a touch gesture or other input to the touch screen display. The user interface 116 may be in communication with the memory 112, communication interface 114, image sensor 118, and/or image processor 120, such as via a bus.

In some example embodiments, the apparatus 102 may comprise, or may otherwise be in operative communication with a camera. Such camera may include a digital camera capable of forming a digital image file from a captured image. The camera may additionally be capable of capturing a video clip. In some example embodiments, the apparatus 102 may comprise or be in operative communication with a camera module 36 or similar camera implementation. In some example embodiments, the image sensor 118 and/or image processor 120 may comprise components of such a camera. As another example, the image sensor 118 and/or image processor 120 may be in operative communication with a camera to enable the capture and output of an image by the apparatus 102.

The image sensor 118 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In embodiments wherein the image sensor 118 is embodied separately from the processor 110, the image sensor 118 may be in communication with the processor 110. The image sensor 118 may further be in communication with one or more of the memory 112, communication interface 114, user interface 116, or image processor 120, such as via a bus. In some example embodiments, the image sensor may be configured to capture an image at a resolution (e.g., a capture resolution) that may be greater than an output resolution supported by hardware of the apparatus 102. As an example, the image sensor 118 may have a capture resolution greater than 12 MP.

The image processor 120 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In embodiments wherein the image processor 120 is embodied separately from the processor 110, the image processor 120 may be in communication with the processor 110. The image processor 120 may further be in communication with one or more of the memory 112, communication interface 114, user interface 116, or image sensor 118, such as via a bus. In some example embodiments, the image processor 120 may comprise an image signal processor.

In some example embodiments, the image processor 120 may be configured to receive an indication of a capture command. The capture command may be generated responsive to a user input to the user interface 116. Depending on the embodiment, such user input may comprise any user selection or actuation of a soft key configured for triggering image capture, selection of an image capture icon on a touch screen display, actuation of a camera/shutter button, and/or the like that is configured to cause capture of an image by the image sensor 118. The capture command may define a scene to be captured. For example, the scene to be captured may be defined as a scene or portion thereof displayed in a viewfinder display at a time when the capture command is received. The scene to be captured may be entirely within the field of view of the image sensor 118. The capture command may further define a resolution at which the scene is to be captured. The image sensor 118 may be capable of capturing an image at the resolution at which the scene is to be captured. However, the resolution at which the scene is to be captured may be greater than an output resolution of the image sensor 118, which may, for example, be constrained by hardware limitations to a resolution that is less than a resolution which the image sensor 118 is capable of capturing.

As an example, FIG. 3 illustrates an example scene to be captured. The scene of FIG. 3 may be within a field of view of the image sensor 118 and the image sensor 118 may be capable of capturing the scene of FIG. 3 at the illustrated resolution. However, the illustrated resolution may be greater than a supported output resolution. Accordingly, for example, if the scene of FIG. 3 were captured at the supported output resolution, the lower resolution image of FIG. 4 may result. This resulting output image may, for example be undesirable to a user if the user plans to make a large size print of the image or otherwise desires the image to have a high spatial resolution.

In some example embodiments, in an instance in which a scene to be captured is to be captured at a resolution exceeding a supported output resolution, the scene may be divided into a plurality of portions and each portion of the scene may be captured in a respective sub-image having a resolution that does not exceed the supported output resolution. In some such embodiments, the image sensor 118 and/or image processor 120 may be configured to determine in response to a capture command whether a scene to be captured has a resolution exceeding the supported output resolution. If not, the scene may be captured as a single image at the resolution defined by the capture command. If not, the scene may be divided into a plurality of portions for capture as sub-images.

Referring to FIG. 5, FIG. 5 illustrates a representation of a scene 502 to be captured. The scene 502 may, for example, comprise the scene illustrated in FIG. 3. As in the example of FIG. 5, the resolution at which the scene 502 is to be captured exceeds a supported output resolution, the image sensor 118 and/or image processor 120 may divide the scene into a plurality of portions having a resolution that does not exceed the supported output resolution. As an example, the scene 502 may be divided into the respective portions 504-520. It will be appreciated that FIG. 5 is provided by way of example and not by way of limitation. As such, an image may be divided into any number of portions and the portions are not limited to being rectangular portions as illustrated in FIG. 5. Further, respective portions may have different respective sizes and/or different respective resolutions, so long as the resolution of a respective portion does not exceed the supported output resolution. The image sensor 118 and/or image processor 120 may be configured to divide a scene into a plurality of portions based on any factor or combination of factors so long as if an image is captured of the portion, the resolution of the captured image does not exceed a supported output resolution. By way of example, a scene may be divided into portions based at least in part on a supported output resolution, the resolution at which the scene is to be captured, and/or the like.

The image sensor 118 may capture and output the respective portions into which a scene is divided as sub-images. In this regard, each respective sub-image may depict a portion of the scene to be captured and may have a resolution less than the resolution at which the scene is to be captured. In some example embodiments, sub-images may be captured, which have at least a threshold amount of overlap (for example, 10% overlap) with a sub-image depicting an adjacent portion of the scene to be captured. Accordingly, it will be appreciated that while FIG. 5 illustrates division of the scene to be captured into discrete portions, a sub-image capturing a portion may overlap adjacent portions. Accordingly, for example, a sub-image capturing the portion 504 may overlap one or more of the portions 506, 510, or 512. Such overlap may facilitate stitching of adjacent sub-images, as will be described further herein below. Referring to FIG. 6, FIG. 6 illustrates example sub-images 602 and 604 that may be captured of portions of the scene illustrated in FIG. 3 in accordance with some example embodiments.

It will be appreciated that a scene to be captured may not necessarily take up an entirety of a field of view of the image sensor, but rather may comprise a portion of the field of view of the image sensor 118. In this regard, FIG. 7 illustrates an example wherein a region of interest 704 within a field of view 702 of the image sensor 118 may comprise the scene to be captured. Even though the region of interest 704 is smaller than the field of view 702 of the image sensor 118, capture of the region of interest 702 at a desired resolution may still exceed a supported output resolution. Accordingly, the region of interest 704 may be divided into portions, such as the portions 706-712, and captured by a plurality of sub-images.

The sub-images may be captured in response to a single capture command input by the user. As such, in some example embodiments, the capture of the sub-images may be transparent to the user. In this regard, the user may determine the scene to be captured and, in some cases, also a desired resolution, and may command capture of the scene while capture and stitching of sub-images may be handled by the image sensor 118 and image processor 120 without further input from the user.

As the scene to be captured may be entirely within the field of view of the image sensor 118, the sub-images may be captured without requiring movement of the camera (e.g., the apparatus 102 or a camera in operative communication therewith). In this regard, the sub-images may be captured by cropping the field of view of the image sensor 118 to capture respective sub-images at a resolution that does not exceed the supported output resolution. Cropping the field of view of the image sensor 118 may accordingly be used in some example embodiments to enable capture of the sub-images without requiring movement of the camera. Additionally or alternatively, in some example embodiments wherein an optical zoom feature may be implemented, one or more sub-images may be captured by using optical zoom to capture a portion of the scene to be captured at a resolution that does not exceed the supported output resolution. For example, the image sensor 118 of some example embodiments may use off center optical zooming and cropping to facilitate capture of respective sub-images. Such off center optical zooming and cropping may accordingly be used to facilitate capture of the sub-images without requiring movement of the camera.

The sub-images may be captured in a defined order, such as sequentially left-to-right, top-to-bottom or other defined order. Alternatively, the sub-images may be captured in a random order so long as all portions of the scene to be captured are captured in at least one sub-image. In some example embodiments, the sub-images may be captured in a burst capture by the image sensor 118 and provided to the image processor 120 for post-processing, as will be described further herein below.

The image processor 120 may be configured to process one or more sub-images, as needed to remove effects of motion during image capture. In this regard, for example, if the camera used to capture the sub-images was handheld rather than mounted on a tripod, it is possible that a handshake movement may have resulted in one or more sub-images being impacted by motion blur or some other effect to motion of the camera during image capture. As an example, the image processor 120 may be configured to register a sub-image using any appropriate registration method to remove effects of handshake or other motion.

The image processor 120 may be further configured to use the sub-images to generate an output image depicting the scene to be captured at the desired resolution, which may exceed the supported output resolution of the image sensor 118. In this regard, the image processor 120 may stitch or otherwise combine sub-images depicting adjacent portions of the scene to be captured to generate the resulting output image. In combining sub-images to generate the resulting output image, the image processor 120 may, for example be configured to use a panorama algorithm.

In order to facilitate stitching of adjacent sub-images, the image processor 120 may be configured to perform post-processing on respective adjacent sub-images. For example, adjacent sub-images may be warped, color corrected, corrected for exposure variations, labeled, blended, and/or the like by the image processor 120. Additionally, edges of adjacent sub-images may be aligned in order to enable stitching. Further, displacement between adjacent sub-images may be computed to facilitate blending and meshing of overlapping portions of adjacent sub-images.

Following post-processing and stitching, the resulting output image may depict the field of view to be captured at a resolution exceeding the supported output resolution. Accordingly, image sensors, such as the image sensor 118 which are capable of capturing an image at a resolution greater than a supported output resolution may be leveraged to enable the generation of high resolution images. It will thus be appreciated that some example embodiments may effectively circumvent a hardware-limited output resolution without requiring potentially cost-inhibitive improvements in hardware that may be required to increase the supported output resolution. As an example, an output image generated in accordance with some example embodiments may depict the scene of FIG. 3 at the resolution illustrated in FIG. 3, even though the supported output image may limit a resolution of the scene of FIG. 3 to that of the image illustrated in FIG. 4.

Referring now to FIG. 8, FIG. 8 illustrates a flowchart according to an example method for generating an output image capturing a desired scene according to an example embodiment. The operations illustrated in and described with respect to FIG. 8 may, for example, be performed by, with the assistance of, and/or under the control of one or more of the processor 110, memory 112, user interface 116, image sensor 118, or image processor 120. Operation 800 may comprise determining a scene to be captured at a first resolution. The scene may be within a field of view of the image sensor 118. The processor 110, memory 112, user interface 116, image sensor 118, and/or image processor 120 may, for example, provide means for performing operation 800. Operation 810 may comprise causing capture by the image sensor 118 of each of a plurality of sub-images at a respective second resolution. Each second resolution may be less than the first resolution. For example, each respective sub-image may be captured at a single second resolution, the single second resolution being less than the first resolution. Alternatively, respective sub-images may be captured at various respective second resolutions, so long as each such second resolution is less than the first resolution. In this regard, the first resolution may, for example, exceed a supported output resolution, but may be within a capture resolution supported by the image sensor 118. Each second resolution may be a resolution that does not exceed the supported output resolution. Each of the plurality of sub-images may depict a portion of the scene to be captured. The processor 110, memory 112, image sensor 118, and/or image processor 120 may, for example, provide means for performing operation 810. Operation 820 may comprise using the plurality of sub-images to generate an output image depicting the scene to be captured at the first resolution.

FIG. 9 illustrates a flowchart according to another example method for generating an output image capturing a desired scene according to an example embodiment. The operations illustrated in and described with respect to FIG. 5 may, for example, be performed by, with the assistance of, and/or under the control of one or more of the processor 110, memory 112, user interface 116, image sensor 118, or image processor 120. Operation 900 may comprise receiving an indication of a capture command defining a scene to be captured and a first resolution at which the scene is to be captured. The scene may be within a field of view of the image sensor 118. The processor 110, memory 112, user interface 116, image sensor 118, and/or image processor 120 may, for example, provide means for performing operation 900. Operation 910 may comprise dividing the scene to be captured into a plurality of portions. The processor 110, memory 112, image sensor 118, and/or image processor 120 may, for example, provide means for performing operation 910. Operation 920 may comprise causing capture of each of a plurality of sub-images at a respective second resolution. Each respective sub-image may depict a respective portion of the plurality of portions into which the scene was divided in operation 910. Each second resolution may be less than the first resolution. For example, each respective sub-image may be captured at a single second resolution, the single second resolution being less than the first resolution. Alternatively, respective sub-images may be captured at various respective second resolutions, so long as each such second resolution is less than the first resolution. The processor 110, memory 112, image sensor 118, and/or image processor 120 may, for example, provide means for performing operation 920. Operation 930 may comprise processing the sub-images, as needed to remove effects of motion during capture. The processor 110, memory 112, and/or image processor 120 may, for example, provide means for performing operation 930. Operation 940 may comprise processing adjacent sub-images to enable stitching of the adjacent sub-images to generate an output image. The processor 110, memory 112, and/or image processor 120 may, for example, provide means for performing operation 940. Operation 950 may comprise stitching the sub-images to generate an output image depicting the scene to be captured at the first resolution. The processor 110, memory 112, and/or image processor 120 may, for example, provide means for performing operation 950.

FIGS. 8-9 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program products) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    determining a scene to be captured at a first resolution, wherein the scene to be captured is within a field of view of an image sensor;
    causing capture by the image sensor of a plurality of sub-images using off-center optical zooming and cropping at a respective second resolution, the second resolution being less than the first resolution, wherein the plurality of sub-images depicts a portion of the scene to be captured; and
    using the plurality of sub-images to generate an output image depicting the scene to be captured at the first resolution;
    wherein the image sensor is capable of capturing an image at the first resolution, but an output resolution of the image sensor is constrained by hardware limitations to a third resolution that is less than the first resolution, and wherein the second resolution comprises a resolution less than or equal to the third resolution.

2. The method of claim 1, wherein determining the scene to be captured and causing capture of the plurality of sub-images are performed in response to receiving an indication of a single capture command, the capture command defining the scene to be captured.

3. The method of claim 1, wherein causing capture of a respective sub-image of the plurality of sub-images comprises cropping the field of view of the image sensor to capture, at the second resolution, a portion of the scene to be captured.

4. The method of claim 3, further comprising dividing the scene to be captured into a plurality of portions, wherein the respective sub-image depicts a respective one of the plurality of portions.

5. The method of claim 1, further comprising processing at least one of the sub-images by registering the plurality of sub-images to remove effects of motion during image capture.

6. A computer program product comprising at least one non-transitory computer-readable storage medium having computer-readable program instructions stored therein, the computer-readable program instructions comprising:
    program instructions configured to determine a scene to be captured at a first resolution, wherein the scene to be captured is within a field of view of an image sensor;
    program instructions configured to cause capture by the image sensor of a plurality of sub-images using off-center optical zooming and cropping at a respective second resolution, the second resolution being less than the first resolution, wherein the plurality of sub-images depicts a portion of the scene to be captured; and
    program instructions configured to use the plurality of sub-images to generate an output image depicting the scene to be captured at the first resolution;
    wherein the image sensor is capable of capturing an image at the first resolution, but an output resolution of the image sensor is constrained by hardware limitations to a third resolution that is less than the first resolution, and wherein the second resolution comprises a resolution less than or equal to the third resolution.

7. The computer program product of claim 6, wherein the program instructions configured to determine the scene to be captured and cause capture of the plurality of sub-images comprise program instructions configured to determine the scene to be captured and cause capture of the plurality of sub-images in response to receiving an indication of a single capture command, the capture command defining the scene to be captured.

8. The computer program product of claim 6, wherein the program instructions configured to cause capture of a respective sub-image of the plurality of sub-images comprise program instructions configured to crop the field of view of the image sensor to capture, at the second resolution, a portion of the scene to be captured.

9. The computer program product of claim 8, further comprising program instructions configured to divide the scene to be captured into a plurality of portions, wherein the respective sub-image depicts a respective one of the plurality of portions.

10. An apparatus comprising at least one processor and at least one memory storing computer program code, wherein the at least one memory and stored computer program code are configured, with the at least one processor, to cause the apparatus to at least:

determine a scene to be captured at a first resolution, wherein the scene to be captured is within a field of view of an image sensor;

cause capture by the image sensor of a plurality of sub-images using off-center optical zooming and cropping at a respective second resolution, the second resolution being less than the first resolution, wherein the plurality of sub-images depicts a portion of the scene to be captured; and use the plurality of sub-images to generate an output image depicting the scene to be captured at the first resolution;

wherein the image sensor is capable of capturing an image at the first resolution, but an output resolution of the image sensor is constrained by hardware limitations to a third resolution that is less than the first resolution, and wherein the second resolution comprises a resolution less than or equal to the third resolution.

11. The apparatus of claim 10, wherein the at least one memory and stored computer program code are configured, with the at least one processor, to cause the apparatus to determine the scene to be captured and cause capture of the plurality of sub-images in response to receiving an indication of a single capture command, the capture command defining the scene to be captured.

12. The apparatus of claim 10, wherein the at least one memory and stored computer program code are configured, with the at least one processor, to cause the apparatus to cause capture of a respective sub-image of the plurality of sub-images at least in part by cropping the field of view of the image sensor to capture, at the second resolution, a portion of the scene to be captured.

13. The apparatus of claim 12, wherein the at least one memory and stored computer program code are configured, with the at least one processor, to further cause the apparatus to divide the scene to be captured into a plurality of portions, wherein the respective sub-image depicts a respective one of the plurality of portions.

14. The apparatus of claim 13, wherein the at least one memory and stored computer program code are configured, with the at least one processor, to cause the apparatus to divide the scene to be captured into a plurality of portions based at least in part on one or more of an output resolution of the image sensor or the first resolution.

15. The apparatus of claim 10, wherein sub-images depicting adjacent portions of the scene to be captured have at least a threshold amount of overlap.

16. The apparatus of claim 10, wherein the at least one memory and stored computer program code are configured, with the at least one processor, to further cause the apparatus to process at least one of the sub-images by registering the plurality of sub-images to remove effects of motion during image capture.

17. The apparatus of claim 16, wherein the at least one memory and stored computer program code are configured, with the at least one processor, to cause the apparatus to use the plurality of sub-images to generate the image depicting the scene to be captured at least in part by processing adjacent sub-images to enable stitching of adjacent sub-images to generate the output image.

18. The apparatus of claim 10, wherein the scene to be captured comprises:
   the entire field of view of the image sensor; or
   a portion of the field of view of the image sensor.

19. The apparatus of claim 10, wherein the at least one memory and stored computer program code are configured, with the at least one processor, to cause the apparatus to cause capture by the image sensor of the plurality of sub-images at least in part by causing capture of the plurality of sub-images at a single second resolution.

20. The apparatus of claim 10, wherein the at least one memory and stored computer program code are configured, with the at least one processor, to cause the apparatus to cause capture by the image sensor of the plurality of sub-images at least in part by causing capture by the image sensor of a first sub-image at a first respective second resolution and causing capture by the image sensor of a second sub-image at a second respective second resolution, wherein the first respective second resolution and the second respective second resolution are not equal.

* * * * *